(12) United States Patent
Taylor

(10) Patent No.: US 11,163,858 B2
(45) Date of Patent: Nov. 2, 2021

(54) CLIENT SOFTWARE ATTESTATION

(71) Applicant: CRITICAL BLUE LTD., Edinburgh (GB)

(72) Inventor: Richard Michael Taylor, Edinburgh (GB)

(73) Assignee: CRITICAL BLUE LTD., Edinburgh (GB)

( * ) Notice: Subject to any disclaimer, the term of this patent is extended or adjusted under 35 U.S.C. 154(b) by 610 days.

(21) Appl. No.: 15/573,619

(22) PCT Filed: May 12, 2016

(86) PCT No.: PCT/GB2016/051364
§ 371 (c)(1),
(2) Date: Nov. 13, 2017

(87) PCT Pub. No.: WO2016/181152
PCT Pub. Date: Nov. 17, 2016

(65) Prior Publication Data
US 2018/0114000 A1    Apr. 26, 2018

(30) Foreign Application Priority Data
May 12, 2015  (GB) ...................... 1508035

(51) Int. Cl.
*G06F 21/44*    (2013.01)
*G06F 21/12*    (2013.01)
(Continued)

(52) U.S. Cl.
CPC ............ *G06F 21/121* (2013.01); *G06F 21/12* (2013.01); *G06F 21/44* (2013.01); *G06F 21/51* (2013.01);
(Continued)

(58) Field of Classification Search
CPC ... H04L 9/3271; H04L 9/0643; H04L 9/3213; H04L 63/0807; H04L 63/1441;
(Continued)

(56) References Cited

U.S. PATENT DOCUMENTS

| | | |
|---|---|---|
| 2010/0064048 A1 | 3/2010 | Hoggan |
| 2011/0093503 A1 | 4/2011 | Etchegoyen |
| 2013/0086643 A1 | 4/2013 | Morgan |

FOREIGN PATENT DOCUMENTS

WO    2014/141074 A1    9/2014

OTHER PUBLICATIONS

International Search Report, dated Aug. 8, 2016, issued in International Application No. PCT/GB2016/051364.

*Primary Examiner* — Brian F Shaw
(74) *Attorney, Agent, or Firm* — Saul Ewing Arnstein & Lehr LLP

(57) ABSTRACT

A server computing device can determine if a software application executing on a client computing device has not been tampered. Software executes on the server device and communicates either directly or indirectly with an attestation service; a client software application running on the client computing device communicates with the same attestation service. A client software application that is able to calculate a cryptographic hash fingerprint of its executing code image communicates to the attestation service to prove it is untampered with. The attestation service then generates a pass or fail attestation result. The attestation result is communicated between the attestation service and the server computing device. The behaviour of the server computing device is controlled in a way that is conditional on whether a prior attestation of the client software was a pass or fail attestation result.

20 Claims, 9 Drawing Sheets

(51) Int. Cl.
*G06F 21/51* (2013.01)
*G06F 21/57* (2013.01)
*H04L 29/06* (2006.01)
*H04L 9/06* (2006.01)
*H04L 9/32* (2006.01)

(52) U.S. Cl.
CPC ............ *G06F 21/57* (2013.01); *H04L 9/0643* (2013.01); *H04L 9/3213* (2013.01); *H04L 9/3271* (2013.01); *H04L 63/0807* (2013.01); *H04L 63/1441* (2013.01)

(58) Field of Classification Search
CPC .......... G06F 21/51; G06F 21/12; G06F 21/57; G06F 21/44; G06F 21/121
See application file for complete search history.

CLIENT SOFTWARE ATTESTATION

CROSS REFERENCE TO RELATED APPLICATIONS

This application claims the priority of PCT/GB2016/051364, filed on May 12, 2016, which claims the benefit of priority to GB Application No. 1508035.1, filed on May 12, 2015, the entire contents of which are fully incorporated herein by reference.

TECHNICAL FIELD

The present invention is in the field of authenticity checking of software code being executed on a client computing device. In the context of client-server computing systems it is desirable for software running in a server computing device to request that the client computing device attests that it is running an authentic version of application software. Furthermore it might also be desirable to attest that the client is also running specific operating system platform software. The purpose of this is to determine if the client software and its execution environment may have been tampered with or altered in some way. In order to perform said attestation a cryptographic hash fingerprint of the application and platform code running on the client computing device must be calculated. A system and method for managing the said fingerprints across a population of client computing devices being attested is disclosed.

BACKGROUND ART

A software application running on a client computing device may communicate over a network with a software application running on a remote server computing device. If arbitrary new software applications may be installed by a user onto such a client computing device then it is possible that a modified version of the client software is installed, or that another unrelated software application is able to escalate its privileges to modify the said software application. Malicious tampering of client software code can allow its functionality to be changed, either to trick the user of the client software into performing an unintended action or to maliciously exfiltrate data from the server using the privileges afforded to an authorised client user. Known methods, such as passwords and other authentication schemes, may be used by the server software to determine the identity of the client device user. However, the authenticity of the running client software must also be verified. Such verification must assume that a malicious software version is engineered to imitate the authentic version. Challenge-response attestation algorithms may be employed in this scenario to provide a method allowing the client software to attest to its authenticity by calculating a cryptographic fingerprint hash of its executable code. Any modifications to the executable code almost certainly result in a change to the calculated fingerprint hash value and are thus detected by the server software.

A Trusted Computing Base (TCB) can be used to ensure the integrity of an algorithm by providing a secure execution environment in a computing device. Such a secure execution environment provides a distinct protected memory space for the execution of trusted code. Only code that has been cryptographically signed by a root of authority can be installed to run in this trusted environment. Hardware level protection mechanisms within the computing device prevent trusted code being tampered with in any manner by the normal (untrusted) computing environment. In such an environment an application can run in the trusted environment without any possibility of undetected tampering. A tampered version of the software would lack the root-of-authority signature to allow its installation and there is no mechanism for it to be modified by the untrusted environment once it is in-situ. However, the resources available to the trusted computing environment are typically quite limited in terms of computational power, I/O capability and memory. Therefore a more realistic approach is for an attestation module to be installed in the trusted computing environment. This simpler module is then able to perform an integrity measurement on a complete application and provide a signed certificate attesting to the authenticity of the application. This certificate can only be generated from the attestation code in the trusted environment and cannot be forged. Moreover, the integrity measurement attestation algorithm itself cannot be modified. This approach provides a high level of security but unfortunately relies upon the availability of a trusted execution environment and the infrastructure required to securely download and install software into this environment. Such an environment is not readily accessible on many computing platforms.

An alternative approach to the use of attestation and the generation of code fingerprints is the integration of runtime defence mechanisms into the application code. This approach has the advantage that no server side connection is required to initiate an attestation and so this approach is applicable to standalone software applications in addition to those requiring a server side connection. The idea is that runtime defences are inserted into the application that checks that the code has not been tampered with. These checks may be inserted automatically at the source code level as part of the build process or via binary rewriting techniques. The inserted checks read blocks of code being executed and ensure that a checksum or other calculated signature for those blocks is as expected. If not then this indicates that the code has been tampered with and the application execution is aborted. To avoid analysis that might locate and then remove the checks, a hierarchy of checking mechanisms may be inserted into the code whereby the checking instructions of one check are themselves included in the checking elsewhere in some other unrelated code section. This makes it extremely difficult to remove checks without detection. The approach may also be further enhanced to add code self modification so that attempts to subvert the checking by manipulating memory addresses, such that the checking reads the original code while modified code is actually run, are thwarted. To do this the checking code also writes code modifications which are essential for the correct operation of the code. Thus attempts to redirect check code accesses will be detected. The prior art of the runtime defence approach has a number of limitations. Firstly, it is typically only used to defend application code itself and not the underlying support libraries that the application depends upon. Such libraries can also be modified to maliciously attack the behaviour of the application itself since they have full access to the application data that can be freely modified. Secondly, the introduction of self-checks cause performance degradation to the application performance and increase code size. In order to mitigate against this, profiling or user guided placement of checking points can be employed but at the cost of the ease of integration of the checking. Thirdly, the insertion of the defences during the application build can complicate and elongate this build process. Fourthly, a different self-defence mechanism needs to be implemented for other source languages, such as Java or Javascript.

The technique of oblivious hashing has similarities to both remote attestation and runtime defence integration. The concept is that the application code is modified to interleave the calculation of a hash code alongside the execution of the original application logic. The calculated hash provides a representation of the paths taken through the code and this hash must either be self checked or passed to a server application for checking. Any attempt to modify the application logic will likely result in a detectable change to the oblivious hash that is calculated that allows such tampering to be detected. The oblivious hash calculation and the underlying application logic are tightly interleaved in the generated code, rendering attempts to modify the application logic without impacting the hash calculation very technically challenging.

Another approach employed in the background art is to provide a renewable security mechanism for the attestation algorithm. The concept is that the attestation algorithm is not permanently fixed so it is not possible to make a one-time modification that enables a forged attestation. Such schemes may require a new attestation algorithm implementation to be downloaded from a remote server each time an attestation is performed. Each such attestation algorithm returns a different fingerprint based on the code being attested and the attestation algorithm employed. Thus it is not possible to defeat such a system by simply not installing or using the updated algorithm since this will be detected. The server can select a family of different algorithms at random, or generate new variants automatically. Such renewable security schemes defeat an attacker since it is not plausible for modified versions to be made available for the full family of possible algorithms. Moreover, developing an automatic method to implement the modifications via analysis of the new attestation algorithm as it is downloaded is not technically practical. The main objection to such an approach of renewable security is that, by its very nature, it opens up a channel whereby new arbitrary code must be inserted into the running environment of the application. In a realistic implementation such code would require a valid cryptographic signature to allow it to be executed, but this would likely result in the vendor of the renewable security mechanism being a target for attacks against such a system. A standard operating system supported application update feature might also be used to update the attestation. However, such systems typically require the entire application to be updated so it is not practical to update at the frequency desired, as this would be undesirable from the perspective of the bandwidth required to support such frequent updates. Furthermore, such an approach of using an existing update mechanism does not enable the creation of a wide population of slightly different attestation algorithms since the updates are typically broadcast out identically to all devices. Maintaining implementation diversity is crucial to providing security in this approach so such broadcast based updates are not appropriate.

SUMMARY OF INVENTION

In one aspect is a server computing device determines if a software application executing on a client computing device has not been tampered with. Software executes on the server device and communicates either directly or indirectly with an attestation service; a client software application running on the client computing device communicates with the same attestation service. A client software application that is able to calculate a cryptographic hash fingerprint of its executing code image communicates to the attestation service to prove it is untampered with. The attestation service then generates a pass or fail attestation result. The attestation result is communicated between the attestation service and the server computing device. The behaviour of the server computing device is controlled in a way that is conditional on whether a prior attestation of the client software was a pass or fail attestation result.

Other optional features of the method include one or more of the following:

- the calculation of the cryptographic hash is influenced by a nonce value supplied by the attestation service to protect against a known good response being replayed to falsify the correctness of the client software image.
- the correct fingerprint results for the cryptographic hash are gathered by executing a known good software application on a known good client computing device.
- the calculation of new, known good challenge-response pairings is performed as part of the process of performing a challenge-response test at some earlier time on a different client device.
- the communication between the attestation service and server computing device is communicated indirectly via the client computing device by means of a signed token provided from the attestation service to the client computing device, in which: a shared secret key is known by the attestation service and the server computing device but not by the client computing device; said secret being used to sign the token such that it proves that the signer is in possession of the secret key.
- the server computing device terminates further communication with the client computing device if it has failed attestation.
- fraud can be prevented, by comprising the steps: unique characteristics of the device on which the client software is executing are extracted and passed to the attestation service; the code used to extract the characteristics forms part of that attested for integrity; the attestation service can pass the collected information to the server device which can compare it against other information provided by the client software; the attestation service may reject requests made by the client software when there is inconsistency in the information from the two paths that may be indicative of fraud.
- communication termination is used in the domain of Distributed Denial of Service (DDoS) attack mitigation by ensuring that server computing resources are only used for servicing attested clients and rejecting attempts to access server resources from malicious client computing devices unable to pass attestation.
- requests from unattested applications are rejected before they have any opportunity to issue malicious requests designed to expend the resources of or exfiltrate confidential data due to security flaws from the application server.
- fingerprints for the application and operating system components are gathered independently and stored in different parts of the database on the attestation server.
- the server computing device refuses to provide requested services and/or data if the client computing device if it has failed attestation.
- the server is a software licensing server.

A system and method are disclosed that enable, in one implementation, a crowdsourced device fingerprinting mechanism to support the attestation of application and potentially operating system software running on a client device.

The context for the disclosed implementation of the invention is a system incorporating a number of client computing devices that interact with a server device. These client computing devices execute software that communicates with the server to access centrally stored information, or to facilitate transactions or communications with other computing devices enabled by the said server. The software executed on the client may be of the form of a standalone application that is installed onto the client computing device by a user or may be in the form of scripting code running in the context of a web browser running on the client.

In such a system it is advantageous for the server software to be able to authenticate the code that is executing on the client computing devices. In many such systems the user may install new software onto the client computing device so that it is possible that the installed software is not the official version. Alternatively, other malware software has been installed that deliberately interferes with other application or platform support software in some way. Such code changes may be deliberately malicious and may have been designed to either exfiltrate confidential information from the server software or to trick the user of the client computing device to initiate or confirm some action that they did not intend. For instance, in the context of a mobile banking application, such a modification might trick the user into authenticating a payment transfer to an unknown third party by manipulating the information shown to the user in the mobile banking application. Under normal circumstances the server software would not be aware of this tampering and the transaction will appear completely standard to it. Thus to prevent such tampering in this example scenario it is highly beneficial for the banking server software to be able to request that the client banking software attest that it is indeed an official unmodified version of the application. Furthermore, it is possible for user interface manipulation to be implemented using only changes to the underlying operating system support libraries on the client computing device without any direct modification to the application software code itself. Therefore it is desirable for the server software to be able to request that the client software also attests that the application support libraries are not modified.

The attestation is performed by the client computing device upon request using an additional software library integrated into the application that is being attested. In the preferred embodiment this library will be incorporated as part of the build process for the application prior to its distribution to and installation on the client computing device. It will be appreciated however that the attestation capability could also be provided by an operating system feature or some other application installed on the same client computing device that can check the integrity of other applications running on the device, including the one for which attestation is requested.

In the preferred embodiment attestation is undertaken by the client application by means of it calculating cryptographic signature fingerprints that comprise the application and optionally the underlying platform support software code. A fingerprint calculated for the application itself is only influenced by code that forms part of the application. Furthermore, a fingerprint for the platform code only incorporates code from the platform libraries themselves. If the cryptographic fingerprint matches the expected value then this provides a very high level of confidence that the code has not been tampered with in any way. If a fingerprint value has a sufficiently large number of bits (in the preferred embodiment, 512 bits) then the chance that a code change will not also result in a change to the fingerprint is vanishingly small. Moreover, the avalanche effect inherent in the cryptographic hash calculation ensures that it is extremely difficult to engineer specific code changes such that they map to the same fingerprint value in order to avoid detection.

In the preferred embodiment the attestation is performed by a server service distinct from that providing the application specific communications to the client software application. This attestation service may be contacted by the client application in order to perform an attestation in to prove that it is running an untampered application. Confirmation of the attested status of the client application may then be provided to the application server via a direct communication channel, or by means of a signed token passed indirectly from the attestation service to the application server by way of the client application. Such a signed token is cryptographically secured by a signature including a secret not known to the client application software.

A primary inventive aspect disclosed herein is the handling of the fingerprints and the establishment of whether a given fingerprint represents an attestation pass or fail. The client computing device is not aware of whether the generated fingerprint represents an attestation pass or fail. It responds to the attestation request with the requested fingerprints and the server software determines whether that represents a valid response. Since the server can terminate communication with the client computing device should the attestation fail, this prevents any tampering with the client software allowing continued communication. The server software must therefore maintain a database of fingerprints that are known to be valid. The known good fingerprints are initially established by making attestation requests to a known trusted set of client computing devices. These devices are maintained in a controlled access environment whereby it is known that only official versions of the application software are installed and the installation of other software on the devices is highly controlled to prevent the possible installation of malware that may modify the installed applications or the operating system. The attestation requests to these trusted devices will provide the known good fingerprints for particular versions of the application software. These may then be recorded in a server database and provide the golden, known good, response expected from other devices. The known good fingerprint only needs to be obtained once from a device in the trusted pool and no further requests need to be made to this trusted device, so the number of attestation requests placed on the trusted pool is modest to support an arbitrarily large number of untrusted devices. The database entry will record the details of the particular version number of the application since attestation supporting several different application versions that may be in the field simultaneously may be required.

As an additional optional further enhancement, known good attestation fingerprints must also be extracted for the operating system platform libraries across a range of different computing devices. These computing devices may have different operating system variants and/or versions installed. Ideally these different variants should be represented in the set of trusted computing clients that the server relies upon to initially generate known good fingerprints. If a particular computing device type and software variant is not present in the set of trusted devices then no definitive pass/fail attestation response can be determined when attesting such a device in the untrusted device population. When known good platform fingerprints can be obtained they are held in the server database indexed by computing device type and version so that the correct fingerprint comparison can be made when a future attestation comparison is performed.

A further enhancement may be made to the system to handle challenge-response style attestation. In this approach a challenge value is provided to the client computing device to be used as a seed (sometimes referred to as a salt) for its cryptographic calculations. The resulting fingerprint is then a combination of both this challenge value and the code content being attested. The advantage of incorporating a challenge into the protocol is that it defends against replay attacks. That is, if there is a known good pass value for a signature then this might be reported by a tampered version without performing any actual attestation of its running code. This spoofed value fools the server into believing that the client device is running untampered code. The challenge-response enhancement overcomes this by ensuring that particular challenge values are only used once (in which case they are termed a cryptographic nonce), or at least a small number of times, to effectively circumvent the possibility of a successful interception and replay attack.

The use of challenge-response, however, presents further complications for the server and the management of known good fingerprint responses. The cryptographic nonce is different each time and is included in the hash calculation data stream prior to the code image being attested. Thus for the server to be able to calculate the correct hash value it must have store a copy of the code image and perform the same hash calculation as the client device for a particular attestation with a particular nonce value. This is only possible if the portion of the code image that is being attested is identical across all client devices.

If the complete code image cannot be made available to the server then it is not possible for it to determine the correct attestation response given a new nonce challenge. In this case a transitive mining approach is used to establish a chain of trust for the attestation of devices. A known good attestation fingerprint is initially established from a device in the trusted set. In this case both the challenge value and response (i.e. the known good fingerprint) are recorded in the database. When an attestation needs to be performed on a device in the untrusted device set then the same challenge value is provided by the server with the expectation of receiving the same response for the attestation to pass. However, in addition to providing the challenge for which there is a known response, the server also provides an additional challenge with a new randomly generated challenge value for which it does not know the correct response. The client device being attested provides a response to both the challenges. If it is responds correctly to the challenge with the known good responses then it is assumed that the response to the new randomly generated challenge must also be valid. This new response can then replace the previous one in the database so it becomes the challenge (with known response) to be used for the next attestation request performed by the server. This response mining establishes a chain of trust from the initial response from a device in the trusted set through attested computing devices that respond correctly to provided challenges. In general a set of challenges will be posed for each attestation and these will be mixed between actual challenges (with a known good response) and mining challenges (for future use by the server). These will be randomly mixed up and are indistinguishable by the client computing device so that it is unable to manipulate the responses and induce intentionally incorrect fingerprints for mining challenges. The ability to attest whether a client device is executing an untampered version of a software application has a number of potential uses. One example is to provide security between the server and client devices. If the server is able to determine that it is communicating with a tampered version of the client software, or indeed some completely unrecognised software agent, then it can refuse continued communication to prevent any possible data breach. In this case and the following examples it is assumed that the client software will perform an attestation using the attestation service prior to initiating communication with the application server. At this point the client software can passed an authentication token, issued by the attestation server, to the application server to prove its authenticity. In another embodiment the client software may be uniquely identified, perhaps by means of its IP address, and then the application server can enquire about the authenticity of the client software by communicating with the attestation server using the IP address as identification. In either case, if the attestation has failed, then the attestation server can disconnect communication with the client software and refuse to provide requested services and/or data. Another example is in the domain of software licensing whereby the server can refuse communication with any unofficial or otherwise tampered versions of client software that may be seeking to defraud or otherwise abuse the server resources. The attestation status of the client software may be used to determine if application server responses are given. When such responses are integral to the continued correct operation of the client software then this effectively disables the usage of tampered client applications.

A further example is in the domain of Distributed Denial of Service (DDoS) attacks at the application level. Such attacks seek to exhaust service resources by launching many requests to a server from a variety of different network locations with the intent of significantly diminishing the quality of service provided to legitimate users. If attestation as disclosed herein is employed then the application server is able to reject requests from client software applications that are unable to pass the attestation process, thus significantly reducing the server load that can be imposed by such a DDoS attack. When an unknown client makes an initial connection to the application server an initial check will be made, either via a passed token or via an indirect attestation server lookup, to ensure that the request is emanating from an attested client software application. Requests from unattested applications can be rejected at any early stage before they have any opportunity to issue malicious requests designed to expend the resources of the application server. Attested client applications can be accepted given that there can be some confidence that they cannot be used to deliberately issue request sequences designed to overload the application server.

This list of example applications should not be considered limiting and other applications of this attestation technology are within the scope of this invention.

DESCRIPTION OF PRESENTLY PREFERRED EMBODIMENT

A system and method are described that enable a server device to interrogate the authenticity of software running on a remote client device. In this scenario there is a concern that the software running on the client device may have been tampered with in some manner. Such tampering may be used to launch a software based attack against the server or perhaps to trick the user of software on the client device into performing some unwanted action by manipulating the output of such software running on the client device. Authentication of the user of the client device is not sufficient to prove the authenticity of the actions requested by the client device software if the client software itself has been tampered. Thus it is desirable for the server device to check the authenticity of the client software itself in addition to checking the authenticity of any user of that client device. We term the process of a client device proving the authenticity of its software code as it attesting to the server. The overall process is termed remote software attestation.

Figure 1:
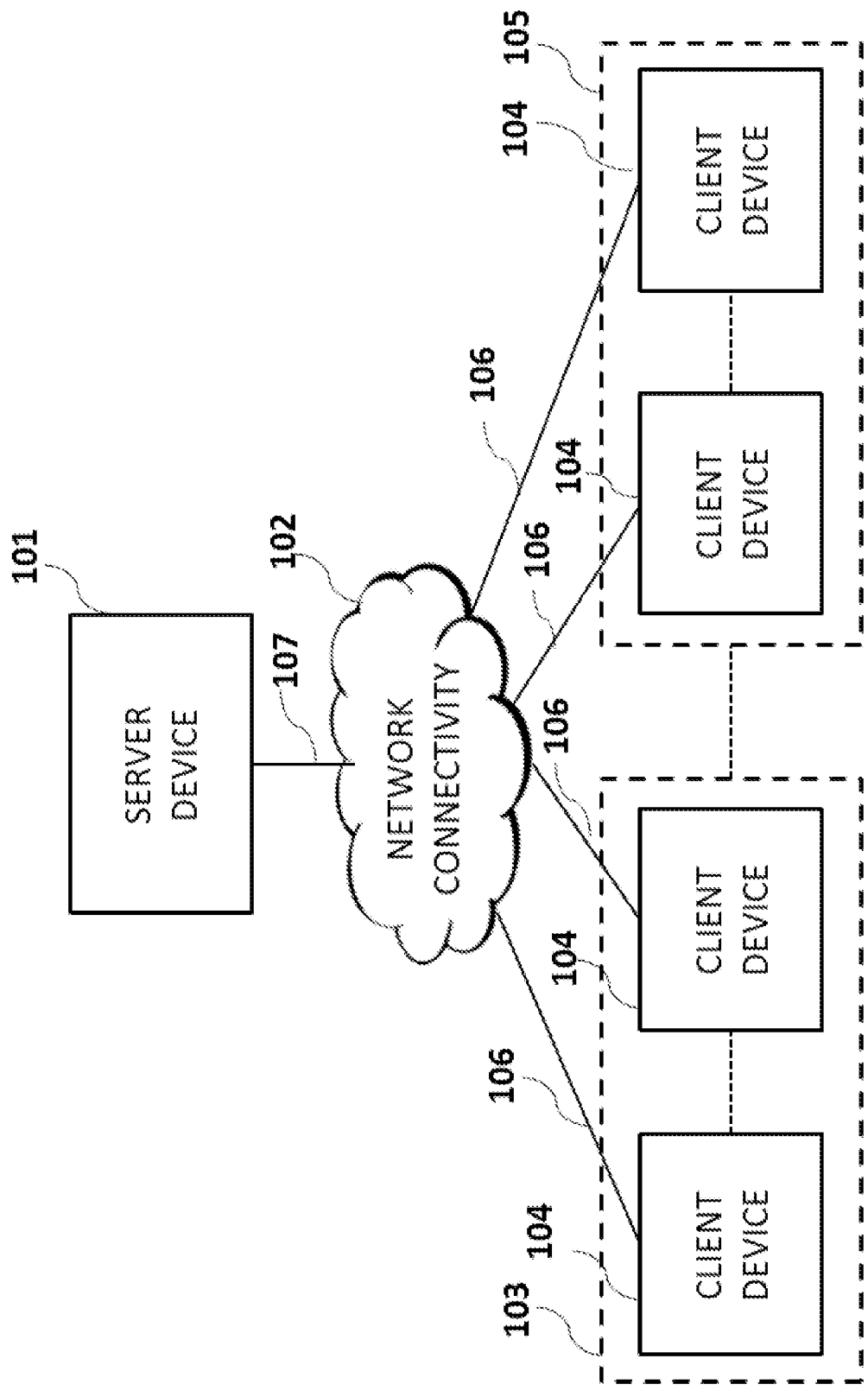
FIG. 1 illustrates how a cohort of client devices, potentially of differing platform types and versions, communicate with a centralised server device.

Referring to FIG. 1 an embodiment is depicted whereby a server device 101 communicates via a network 102 with a plurality of client devices 104. Transactions performed by the devices 104 are communicated using the network connectivity 106 and 107. These networking elements 107, 108 may be implemented by wireless or wired networking means. Moreover, the server device 101 and client devices 104 may, in possible embodiments, be part of the same computing system and may even be implemented on the same electronic component. Furthermore, it will be obvious to those skilled in the art that the server device 101 and client device 104 may actually be a logical distinction corresponding to different processes running on the same processing system.

In the preferred embodiment the network connectivity 102 corresponds to the Internet, the server device 101 corresponds to a group of physical servers providing a service for a particular application and client devices 104 correspond to client devices such as PCs, tablets, other mobile computing devices or any other computing device connected to the Internet.

In the preferred embodiment there is no requirement for the client devices 104 to be identical in all respects. There may be a plurality of subgroups of devices 103 and 105 corresponding to either different device types or perhaps the same device type running different versions of platform operating system code. In the preferred embodiment the server device 101 should be able to determine the authenticity of the client software code running on a client device 104 whilst accommodating valid variation of other characteristics of the client device that do not threaten the authenticity or operation of the client device software being attested. In one embodiment the server device 101 initiates a request to the client device 104 to prove the authenticity of the executable code being run. In another embodiment it is the client device 104 that initiates the attestation request to the server device 101 so that it may then later prove its authenticity to said server device. It should be obvious to anyone skilled in the art that other variations of this mechanism are possible. For instance, a client device may wish to confirm the authenticity of remote server software, in which case the roles described here are reversed.

In the preferred embodiment the client devices are mobile smartphones or tablets running the Android or iOS operating systems. The management of the Android app store and the capability to install applications directly (side-loading) or via other app stores provides a means to introduce malicious code onto the device. In the preferred embodiment the server devices represent application vendor's servers implementing cloud services used by the installed applications. Note however that the scope of the invention is not in any way restricted to this particular scenario but is provided only by way of illustration.

Figure 2:
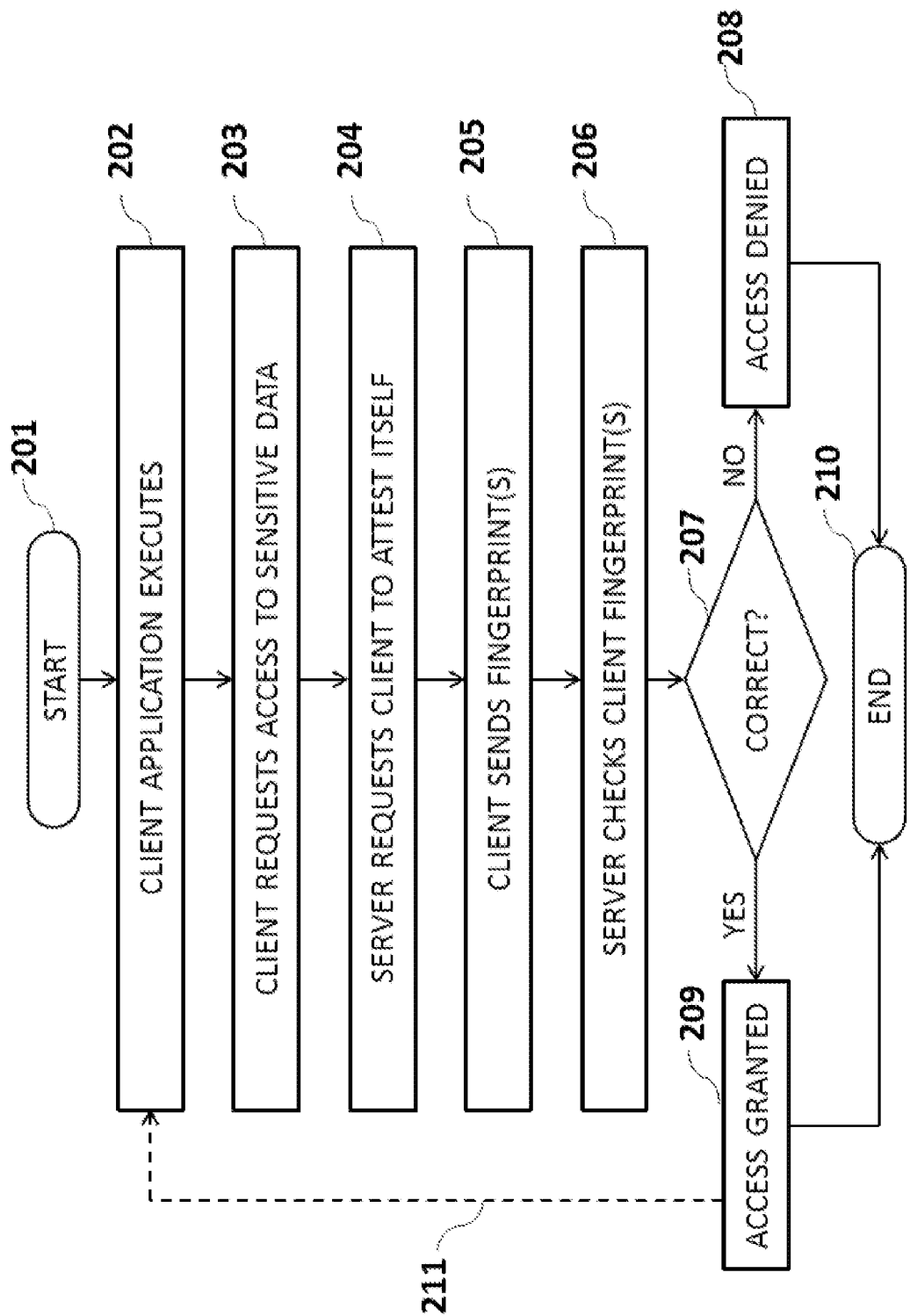
FIG. 2 provides a high level flow showing how client fingerprinting executions may be used to control access to sensitive services and resources in the server.

Referring to FIG. 2 the flow of operations used to attest the authenticity of running software is described. This flow starts at 201 and at some subsequent time client software 202 (running on a device 104 from FIG. 1) is initiated as shown in 202. This client software may perform any number of logical steps depending both on the purpose of this client software and user interaction until some later point 203 where there is some requirement for sensitive data or a sensitive operation 203 that requires the interaction of the server shown as 101 in FIG. 1. At this point the server software may choose to request an attestation of the client software that performed that request 204. It should be obvious to anyone skilled in the art that the exact causation of the request may be dependent on many factors, and may in fact be made on the initial communication between the server and client software prior to any particularly sensitive data or operation requests. In response to the attestation request the client sends a response 205 to the requesting server with some response, such as a software code fingerprint, that provides evidence that the code being executed is authentic. The exact methods used to provide this attestation are many and varied and are not intended to be restricted by the description of the preferred embodiment. The server then checks the fingerprint or other response provided 206 to determine whether the client device software is considered to be authentic. The client device itself is not trusted to make a decision about whether it is trustworthy or not since a program with malicious intent would of course claim to pass such a self-check. Once the server has checked the authenticity it makes a divergent choice based on the result 207. If the attestation check passes 209 then the requested access to server information is granted. After this the process may end 210 or further accesses to sensitive data or services may be required via 211. Further attestation checks may be desirable in this circumstance in case the client software is subject to some malicious attack on its code after the prior attestation check. If access is denied 208 then the connection between the server device and the client device will likely be severed before ending the process 210. Other embodiments are of course possible if access is denied, including a suitable response being provided to the user and/or additional authentication steps being required as part of whatever business process is being undertaken by the server.

As will be understood from FIGS. 1 and 2, the attestation method requires network connectivity between the server device and the client device. Without such connectivity an attestation cannot be performed. Of course it is the intent of the approach to specifically protect systems requiring such client-server network connectivity anyway. Primarily it is high value assets in the form of transactions that can be initiated or data that can be accessed under the control of the server that we desire to protect from malicious manipulation via a tampered client software application. For example, in the context of a banking application executing on the client device, we wish to ensure that the attestation prevents a malicious banking application from tricking a user into making an undesired payment transfer enabled via the banking server application. Such a transfer can only occur in the presence of network connectivity and thus attestation can indeed be performed. Generally the preferred strategy is to perform an attestation as closely in time as possible as the transaction initiation itself to minimize the time window for the client software code to be compromised without detection. It should be obvious to someone skilled in the art that a basic level attestation can be carried out without network connectivity, but using a mechanism of self-attestation of the client software to a service also running on the client device. Such attestation is intrinsically less secure than that validated by a remote server, but can still add some security value for periods of disconnection from the network.

Figure 3:
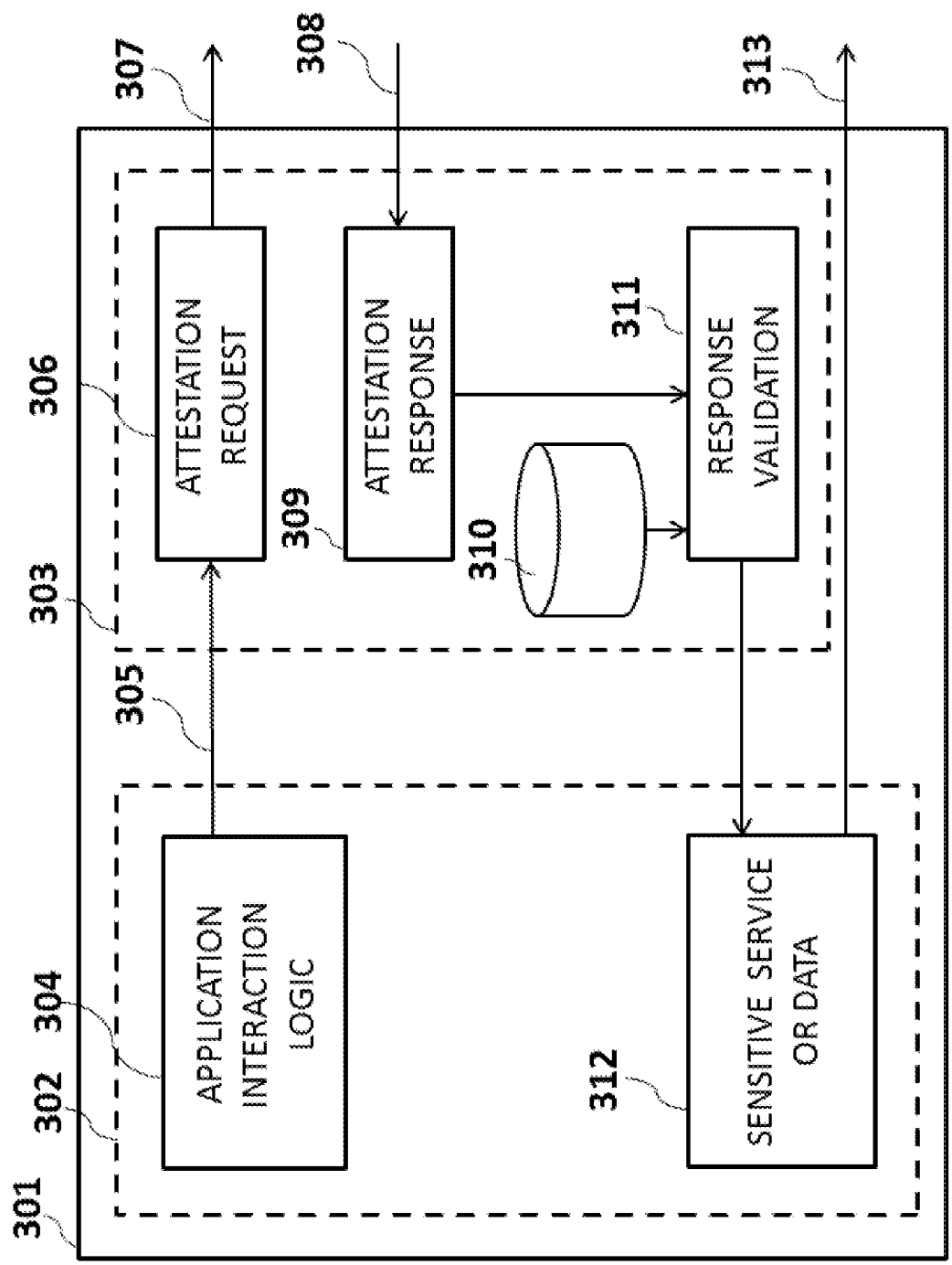
FIG. 3 shows the internal operation of the server and how attestation of client code can be used to gate access to sensitive services or data.

FIG. 3 provides more detail on the internal operation of the server software system 301. Internally this may be partitioned into logic associated with the business process being supported by the server 302 and the attestation mechanism 303. Since the attestation mechanism may be added to existing server code and the function is logically distinct it is advantageous to consider them to be different subsystems. Of course, it will be obvious to anyone skilled in the art that an actual implementation might result in any level of arbitrary interleaving of the business process and attestation logic to achieve the same overall outcome. Application interaction logic 304 is performed by the server in response to requests made by the user via the client application running on a remote device. At some point in this interaction the application logic might want to grant the client application access to sensitive data or services 312. The server initiates an attestation request 305 to determine the authenticity of the client application software. It is at these key transaction points that it makes the most sense to perform a live attestation check of the client software to ensure that it has not been compromised in any way. For instance, in the context of a banking application, this sensitive service or data 312 might be the function to transfer money to another bank account. Since this is a high risk function that might be the target of a malicious attack using modified client software code, protection is maximised by requesting the attestation at this point. This protects against malicious client code modifications that are injected by some process running on the remote client device at exactly the point in time when such a money transfer request is being made.

It will be appreciated that client software could be compromised at any point in time depending upon an attack vector being used on the client device so minimising this time window is advantageous. Attestation of the client software upon the initial connection between the server and client also affords an increased level of protection, so could be employed instead of requiring attestation immediately prior to sensitive data or service. Moreover, another viable strategy might be to request attestation at regular time intervals during the duration of the connectivity period between the server and client. It will be appreciated that various other strategies might be employed in selecting the best intervals to attest the client software.

The attestation request 305 is received by the attestation request module 306. This then forwards the attestation request 307 via a network to the appropriate client device. The original attestation request 305 will include sufficient information to identify the client device and application that must be attested. It will be appreciated by those skilled in the art that the request 307 might be sent to the client device via a connection and communication mechanism different to that being used by the application interaction logic 304 to communicate with the remote client device. Alternatively, the same communication channel may be employed with the higher level protocol being used to distinguish attestation requests and responses from other server/client interaction traffic.

After the client device receives the attestation request 307 it should respond some time later with an attestation response 308. A non-response from the client device or failure to respond within a timeout period will be considered an attestation failure. The exact form of the attestation response 308 will depend on the characteristics of the software attestation scheme employed. It will be appreciated that various authentication and software attestation mechanisms are well known from the prior art. We assume that the attestation will be of the form of a fingerprint of the client software application. This will be provided in such a manner that it is not easily spoofed by a client application that has been modified and seeks to impersonate the real application. In the preferred embodiment the fingerprint takes the form of a cryptographic hash calculated from the software code content. Different components of the client application software and the underlying platform support code may be hashed independently, so the response 308 may contain a plurality of fingerprint responses.

The response validation module 311 receives the response from the attestation response handling module 309 and information from a database of known good fingerprints 310. The method by which this database 310 is initially populated is the subject of steps described later in this description. Let us assume that the database has already been populated with known good fingerprints. The response validation 311 must check that the response from the remote client device is matched in the database. If so then an affirmative response may be sent to the sensitive service or data module 312 which will then grant access to the remote device 313. If the fingerprint is not matched in the database then the attestation will fail and the application server code 302 may choose not to grant access to the sensitive service or data, or might perhaps request additional levels of attestation from the user of the remote client device in order to neutralise any malicious actions being performed by modified client software.

Figure 4:
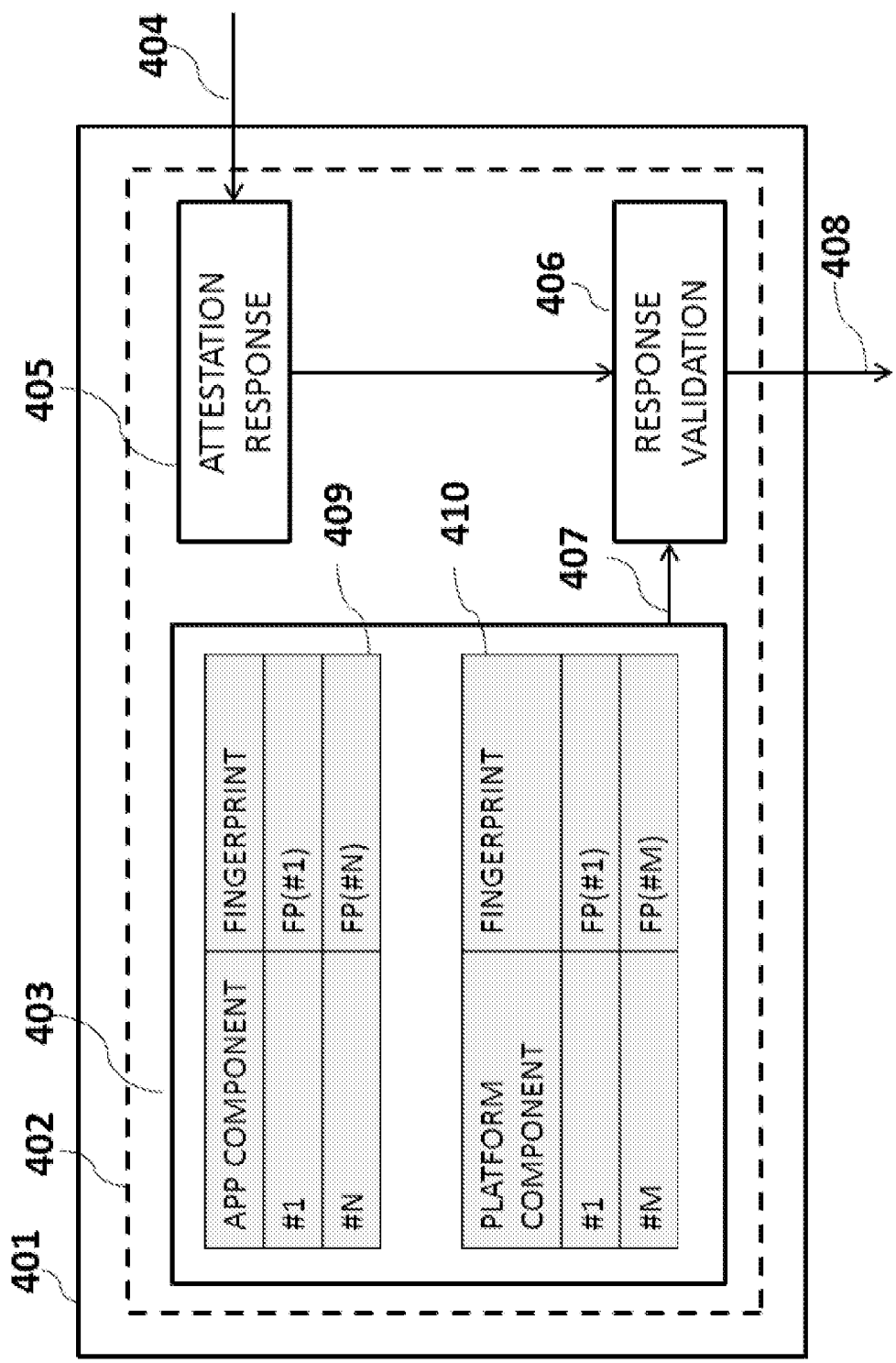
FIG. 4 illustrates how the server may maintain a database of known valid fingerprints to assist with the attestation of client devices.

FIG. 4 provides more details for the attestation response fingerprint database in the preferred embodiment. This database is logically a part of the server system 401, specifically in the attestation handling system 402. A response is received from the client device 404 and is initially processed by the attestation response module 405. The response validation module 406 checks the fingerprint responses with the database 403 via the lookup 407 before determining the attestation response 408. Internally the database 403 may be subdivided into multiple tables as illustrated in the diagram.

It will be appreciated that the exact implementation of the database may take various different forms and that the representation shown in this document is for illustrative purposes only.

In a possible embodiment the returned fingerprint(s) from the remote client device will be separated into fingerprints associated with the client application itself and fingerprint(s) associated with the underlying platform code on which the application is running on. It is desirable to separate the application code fingerprint(s) from the platform fingerprint(s), because the application content should be identical across all of the possible client devices that the application can be run upon. This is illustrated in 409 where individual components of the application have a specific known good fingerprint. These fingerprints are checked against those measured on the client device to check that the application code has not been modified. However, the operation of an application can also be influenced by modifications to the underlying operating system libraries present on the client device. These libraries are typically executed in the context of the same process address space as the application itself and therefore have full access to all of the application's data and are in a position to influence its behaviour whenever a function from an underlying library is called by the application. Thus the fingerprint(s) of the underlying libraries must also be verified. This is illustrated in 410 where the fingerprint(s) of various platform components is provided for known good platforms. Since a given application might run on a range of different operating system versions there is not necessarily a single good version for platform components. In the preferred embodiment the client device's type and operating system version are returned as a component of the attestation response and this directs the correct table values to be retrieved from 410.

Figure 5:
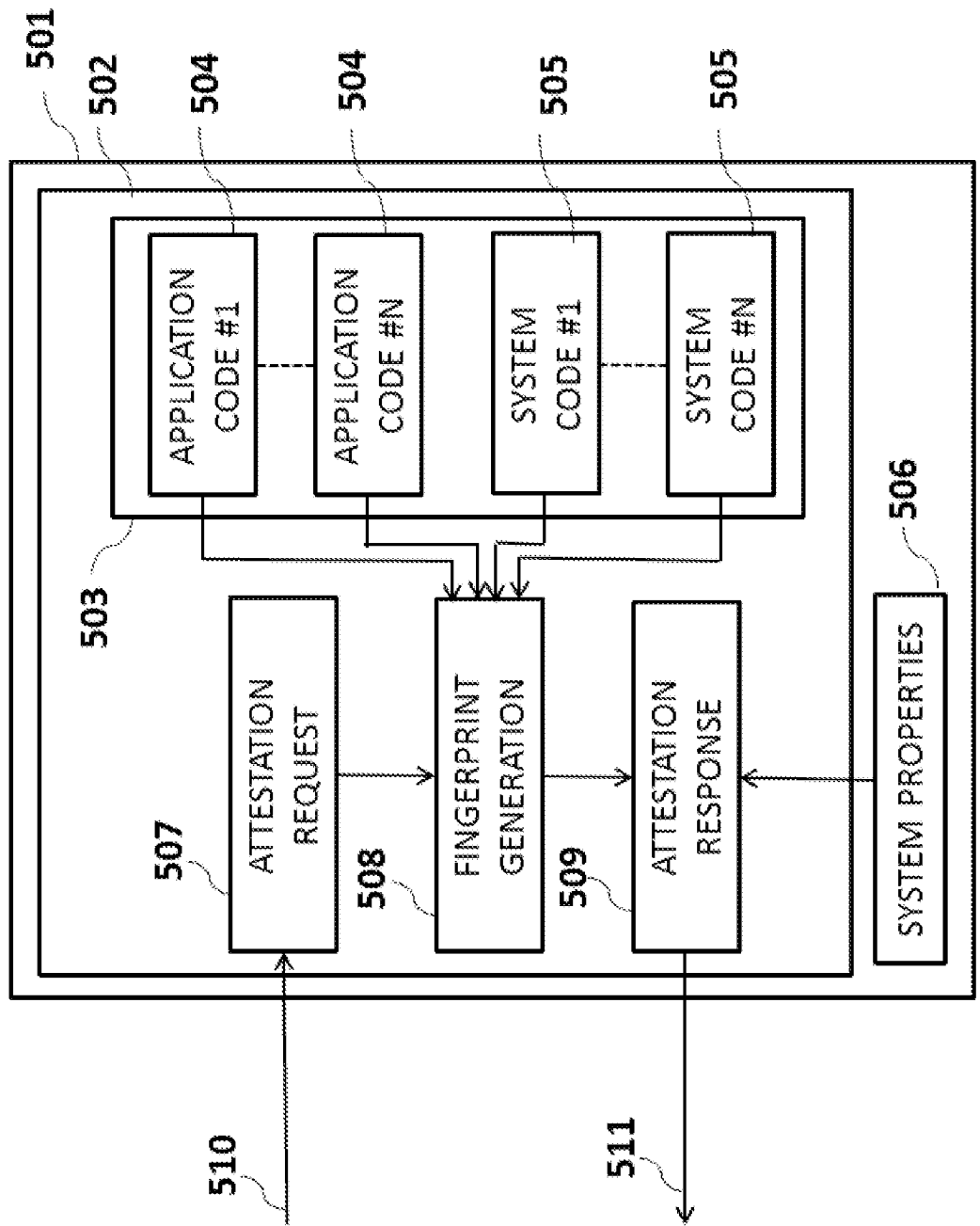
FIG. 5 illustrates how the modules within a client device are used to respond to a fingerprinting request from a server.

FIG. 5 provides more internal detail of the attestation mechanism running on the remote client device 501. The attestation responder component 502 is integrated into any application for which attestation checks by the server are required. An incoming attestation request 510 is received from the server (this corresponds directly to the outgoing request shown in FIG. 4 as 404). This is received by the attestation request module 507 that then arranges for code fingerprint(s) to be generated for the code running in the application. The code mapped into the memory of the application process 503 is the code for which fingerprint(s) must be generated. Typically this memory map will consist of a mix of application specific code 504 and generic system code 505 that form the platform libraries within the operating system. The code fingerprint generation module 508 will be directed to calculate the fingerprints of one or more of these code blocks in the memory map. In the preferred embodiment a cryptographic one-way hashing algorithm (such as SHA-256) is used to calculate the fingerprint signature of the code. This provides a compact signature fingerprint that is very difficult to tamper with. Although many different code sequences will share the same fingerprint, the one way cryptographic nature of the algorithms employed renders it computationally impractical to construct a particular change to the code that will result in an identical fingerprint, assuming a sufficient number of bits are used in the fingerprint (e.g. 512 bits or more). Once the fingerprint(s) has been generated, it is collected by the attestation response module 509 and returned to the server 511 (equivalent to the communication 308 in FIG. 3). In addition to interrogating the memory map of the running application the attestation response module 509 might also access system properties 506. This may include information about the device model number, operating system version or otherwise perform checks upon the authenticity of the operating system kernel. For example, checks can be executed to determine if the device has been rooted allowing arbitrary kernel changes or other operating system modifications that are not approved by the original device vendor. To prevent the results of these system property checks being spoofed by a malicious code modification, the property checking code may be protected using anti-tampering techniques. Moreover, in the preferred embodiment the property reading is performing by making system calls directly to prevent the possibility of subversion via maliciously modified functions in the platform libraries that would otherwise be relied upon. The results of these system property probes are also returned to the server via the communication 511. This information may then be stored by the attestation server so that it this may be subsequently compared with against other information provided by the remote client device 501. Disparities between these two flows of information may be used to detect certain types of fraud enabled by software running on a client software device. For instance, the software may spoof device ID information in order to try and fool a server application that requests are coming from a different device. This can be detected if the device ID is extracted from the system properties 506 and transmitted independently in the communication 511.

Figure 6:
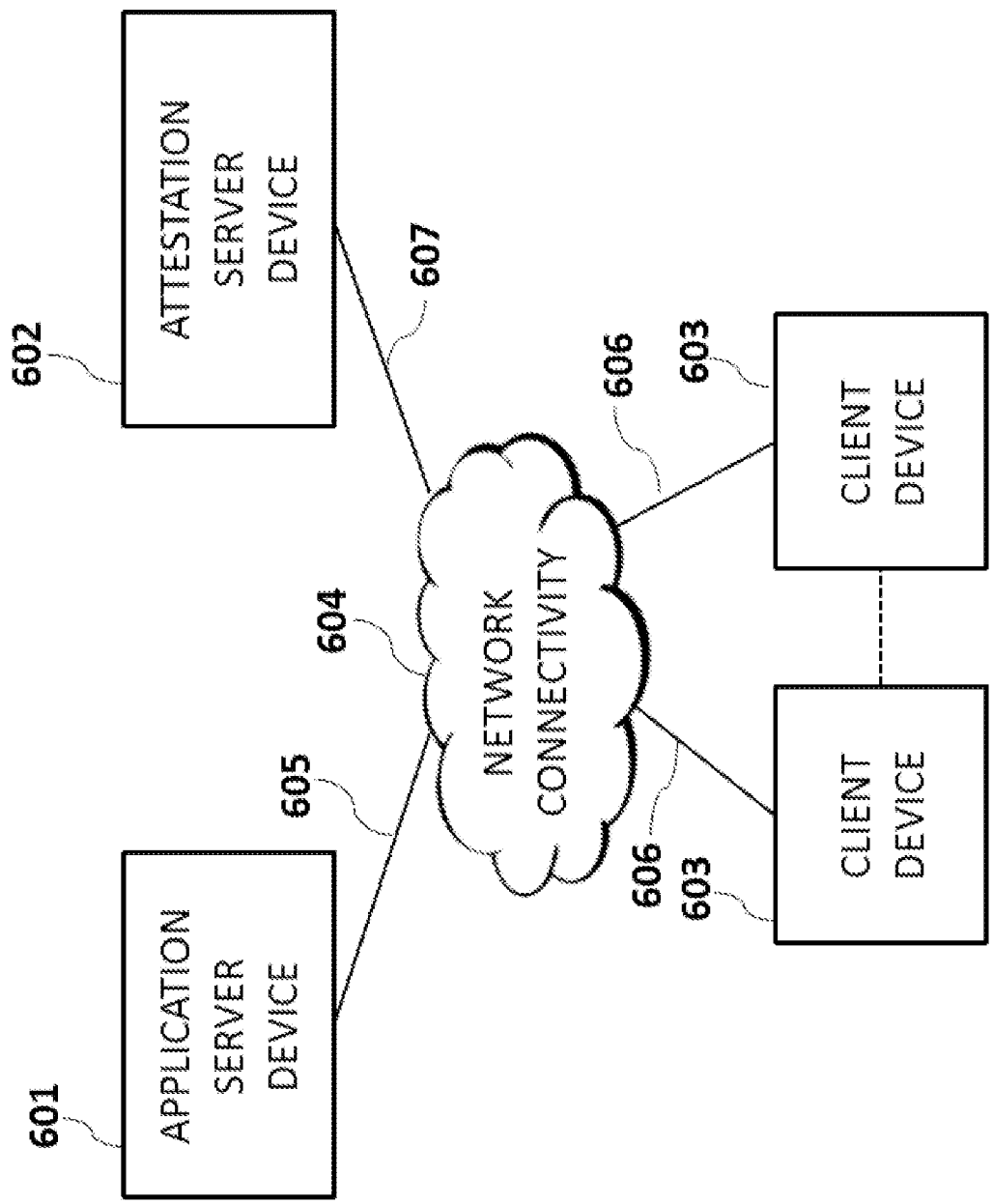
FIG. 6 illustrates how the server side may partition the attestation request service from the application specific serving of request from the client device.

FIG. 6 illustrates a potential partitioning of the application server and the attestation services associated with checking the application running on the client device. As discussed in respect to FIG. 3, the application server logic responsible for communicating with the client application may be considered to be logically independent from the attestation mechanisms. FIG. 6 shows this separation taken to its logical conclusion whereby the application server device 601 is completely distinct from the attestation server device 602. In the preferred embodiment the attestation server software runs on different servers and is managed by a different company to the application server devices. This allows the attestation mechanism to be delivered as a service to the vendor of the application whose authenticity needs to be verified. Moreover, the attestation server devices 602 may be shared for the attestation of various different application server devices 601, verifying various distinct applications. This configuration provides some distinct advantages as information relating to the valid configuration of operating systems on target client devices can be pooled across attestation services for different applications, since the set of target devices and their operating systems will be common.

In the preferred embodiment the application server device 601 and attestation server device 602 communicate over the network 604 using channels 605 and 607. These communication channels are used to initiate an attestation request and to provide a response. In the preferred embodiment the network connectivity 604 is provided by the Internet, allowing arbitrary physical locality between the actors in the communication. It should be obvious to anyone skilled in the art that other configurations are possible. For instance the network connectivity might be provided by a private network or even via communication channels inside the same computing device. The server device 601 communicates with one or more client devices 603 connected to the network via the channels 606. The client devices must be uniquely identified allowing the application server device 601 and attestation server device 602 to communicate regarding which particular device requires attestation. In the preferred embodiment, the client device 603 will initiate a connection with the attestation server device 602. Attestation related communications may then be made over that channel as needed based on attestation requests initially emanating from the application service device 601. The result of the attestation known to the attestation server device 602 may then be communicated to the application server device 601, which may then modify its behaviour to the specific client device 603 depending upon its attestation status. The communication between the attestation server 602 and application server 601 may be performed via the communication channels 605 or 607. Alternatively the attestation server 602 may pass a signed token value to the client device 603 via the network connectivity 604. This token is cryptographically signed with the inclusion of a shared secret key value known to the application server 601 and attestation server 602 but not known to the client device 603. Thus the client device 603 is unable to spoof or otherwise forge a valid token. In the preferred embodiment a Hashed Message Authentication Code (HMAC) protocol can be used with a SHA256 hashing algorithm. The token may optionally include an expiration time and unique information about the client device 603 such as its Internet IP address. This provides a time limit to the validity of the token and prevents its use from other client devices. When the client device 603 wishes to use communicate with the application server device 601 it can pass the token value to prove its authenticity. The application server device 601, which is in possession of the secret key, is able to check the signature of the token and thus prove it was issued by an attestation server device 602.

It should be obvious to anyone skilled in the art that in order to provide a scalable service the application server device 601 and attestation server device 602 may actually consist of a pool of devices over which load balancing can be performed in order to achieve optimised response times.

Figure 7:
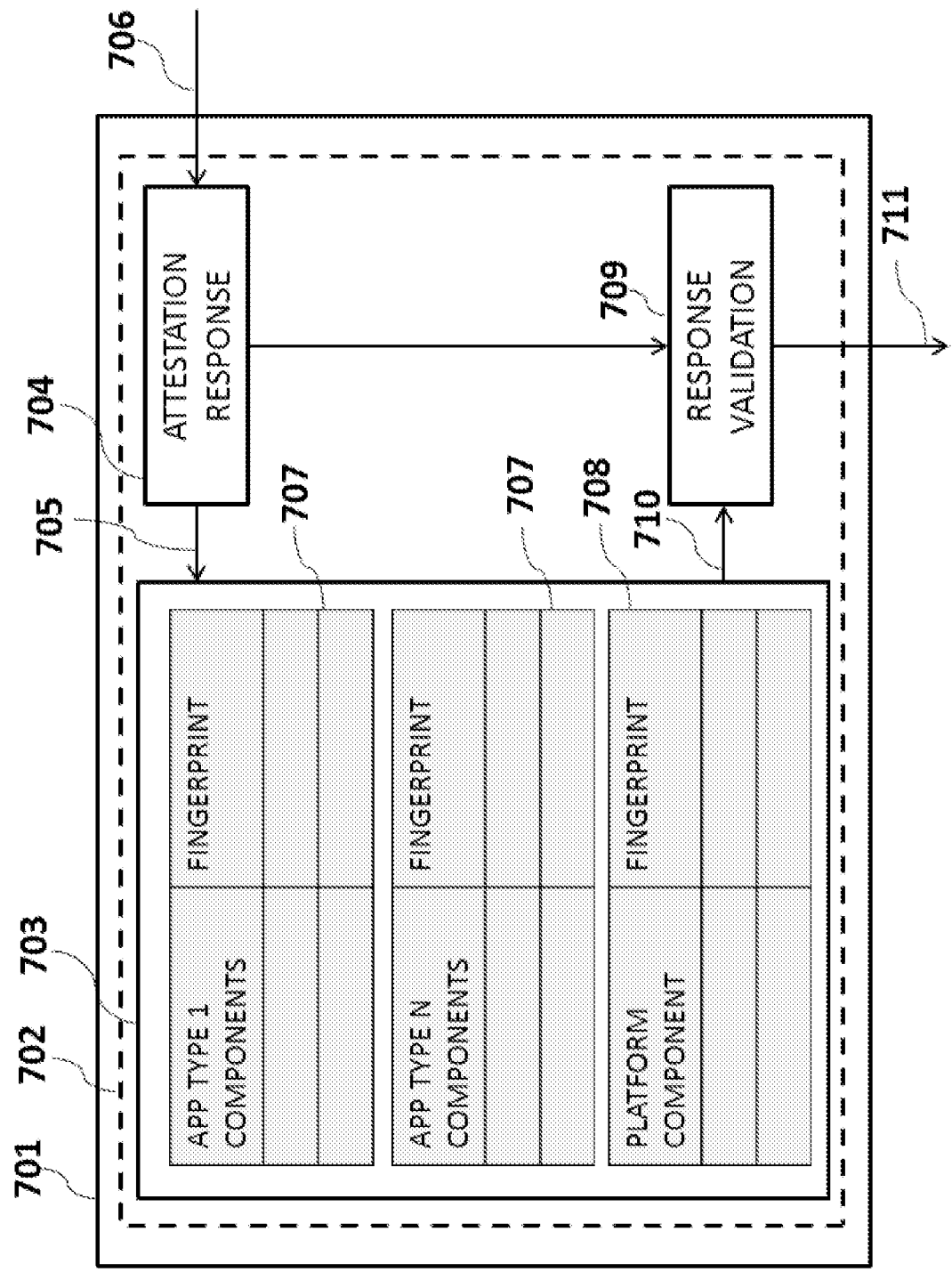
FIG. 7 illustrates how the server may partition results between application and platform components. This enables a single set of platform results collected in the context of attesting one client software application in the context of attesting the same platform running a different client software application

In the configuration described in FIG. 6 the attestation server device 602 may be shared for the purposes of attesting a plurality of different applications. FIG. 7 illustrates how the database within the attestation server might be structured to accommodate this requirement. The structure is largely similar to FIG. 3, with a server application 701 including this shared attestation response mechanism 702. An attestation response module 704 receives the incoming fingerprint(s) from a client application device 706. It then selects which particular fingerprints are of relevance based on information such as client device type and operating system and the type of the application that is being attested. In the database 703 valid fingerprints for particular applications and platform components are stored. For example, 707 shows the valid fingerprints stored for individual components in different applications. The application type information received as part of the attestation response (or known from the context of the original attestation request) is used to ensure that only relevant fingerprints for the correct application type are used. Information about the device operating system and type may also be used to ensure the correct lookup for the correct platform components 708. When the relevant fingerprints are extracted 710 they are then compared in the response validation module 709 to determine if the application and/or platform components are authentic. A response 711 can then be constructed and sent to the attestation server indicating whether the authentication of the remote client code has passed or not.

The separation of fingerprints between those associated with the application and those associated with the platform components is advantageous. Fingerprints might be calculated that are a combination of both the application code and the platform code and a change in either impacts the fingerprint. This means, however, that fingerprints have to be calculated for the application running on each supported platform variant and these fingerprints cannot be shared for the attestation of several different versions of the application. By separating the fingerprints in the manner described the creation of known valid platform fingerprints can be performed independently of the application. If a new version of the application is produced (with, therefore, a different fingerprint) then there is no requirement to recalculate the valid platform fingerprints across the population of supported platforms. Previously available platform fingerprints can be reused alongside the new updated application fingerprints. Furthermore, this allows an attestation server to share platform fingerprint database information between the attestations of completely different applications from different vendors. Moreover, when attesting on an unsupported platform a fingerprint can be matched for the application code even when an attestation of the underlying platform is unavailable.

Figure 8:
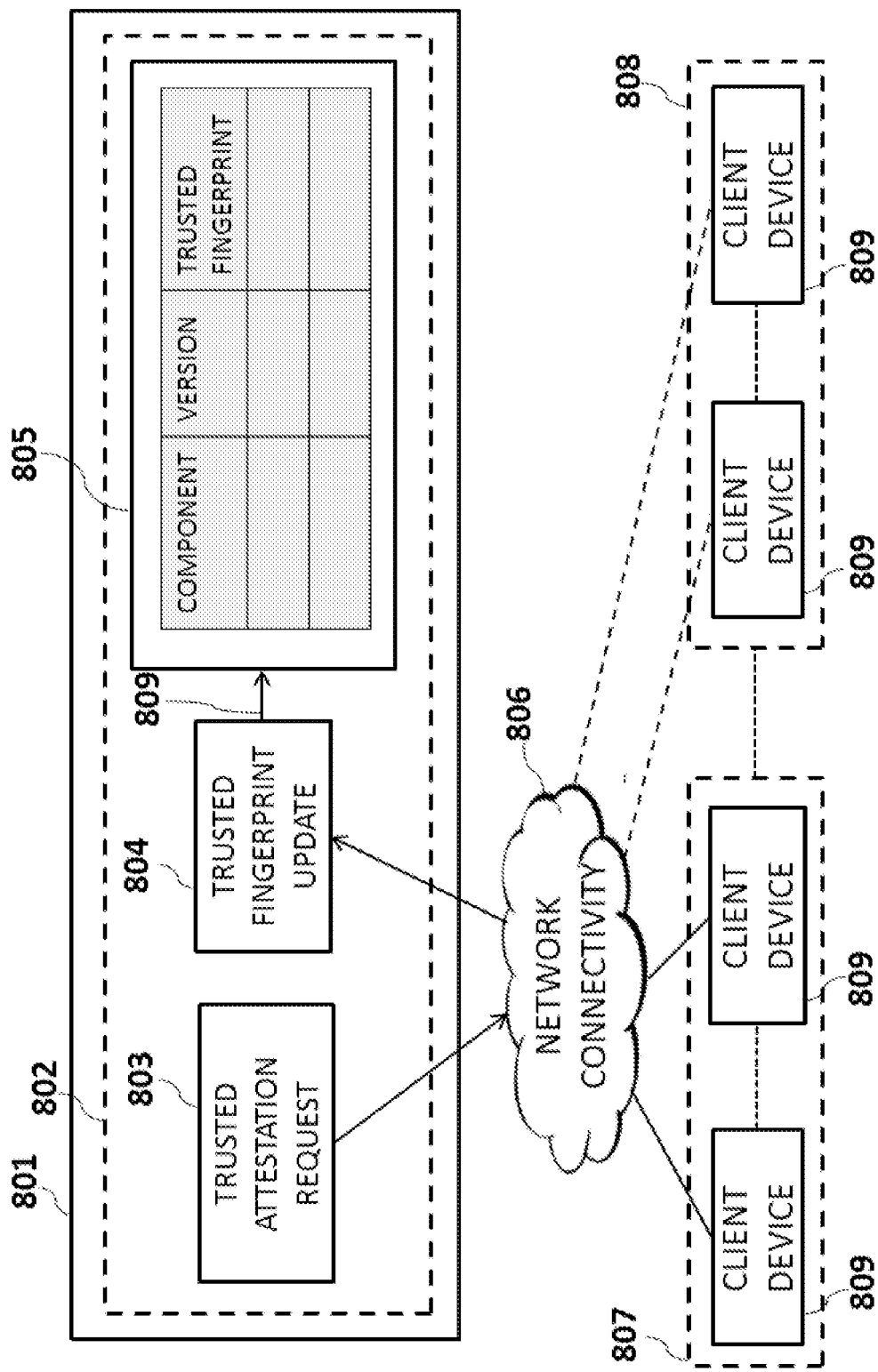
FIG. 8 illustrates how the server maintains a database of previously mined fingerprints that may be used to validate future attestation requests.

In order for the fingerprint matching system described here to work it is necessary for the database in the attestation server to be initially populated with known good fingerprints for particular applications and platform operating system versions. The figures shown in the description so far assume that the database has already been populated with known good fingerprint values for the components. FIG. 8 illustrates how this initial population is achieved. A server 801 includes the attestation module 802. In order to populate the database of fingerprints 805 the trusted attestation module 803 requests an attestation via the network connectivity 806. In this configuration there are multiple client devices 809. Some of these devices belong to a trusted set of devices 807 and some belong to an untrusted set 808. The trusted attestation requests are only ever directed to the trusted set 807. This way we can rely on the fingerprint values that are generated by such client devices and do not need to compare them to some known good fingerprint value before adding the results to the database. These trusted devices may be provided in a specially controlled laboratory where access to them has been restricted and carefully controlled to ensure that any mechanism that might be used to install malicious content onto these devices is blocked. Any one of these trusted client devices responds with a fingerprint (or perhaps a set of fingerprints for the application and platform operating system code) and this is received by the trusted fingerprint update module 804. The trusted fingerprint can then be added into the database 809 for future comparison with untrusted devices 808 in the future for attestation purposes. Note that for the security of the system as a whole it is important to ensure that the communication between the server 801 and trusted client devices 807 is not subject to any man-in-the-middle style attack as this would potentially allow malicious fingerprints to be added as being trusted by intercepting and modifying the response from the client device. Note that it is only necessary to obtain a trusted fingerprint from one instance of a device once in order to permanently add it to the known good fingerprints. Thus the set of known good devices 807 maintained in a controlled environment can be configured as devices at the leading edge of software updates (both the application code and operating system code) with no need to maintain the full spectrum of community wide active installed versions of the application code and operating system code. Moreover, only a single attestation on the trusted set 807 is required to then perform an arbitrary number of future attestations on the untrusted set 808. Therefore the load on initial trusted attestation requests on the set of trusted clients 807 can be quite small even when supporting an arbitrary large population of untrusted devices 809.

It should be obvious to anyone skilled in the art that other mechanisms could be used to emulate the concept of a trusted device in the set 807. For instance, a particular fingerprint could become trusted when it is has been provided independently by a range of different client devices, especially if they are in geographically different areas. This would tend to indicate that the fingerprint can be trusted since the probability of all such devices being infected with the same maliciously modified version of the code can be considered to be low enough.

Note that there can be no guarantee that all types of client device and operating system can be represented in the trusted set 807. This is particularly the case for types of client device 809 where there are a large number of different devices from various vendors that provide compatibility to run the same application. In this case if an attestation request is made for such an unrepresented device then it will not be possible to fully attest it. It is possible to attest the application code itself (since this will be identical across the whole population of devices) but it will not be possible to attest the operating system code, since no trustworthy example implementation will have been made available in the trusted set 807.

The description of the preferred embodiment until this point assumes that a simple attestation request can be made to the client device and the determination of whether the client device code is authentic or not is based on whether it returns a valid fingerprint. As discussed, using cryptographic hashing techniques it is reasonable to assume that this fingerprint can only be computed if an untampered version of the code is present in the client device. However, this does not prevent a simple replay attack being mounted. A malicious version of the code could embed a valid fingerprint in its code and return that upon an attestation request instead of the real fingerprint of the modified code. This would allow it to very simply bypass the attestation mechanism. Encrypting the fingerprint would not improve security as the encryption key must either be available as an embedded secret within the application code, and could thus be extracted, or passed as part of the communication with the server.

Thus in a realistic system, as envisaged in the preferred embodiment, a challenge-response mechanism is employed to avoid a simple replay attack against the attestation mechanism. In such a scheme the attestation mechanism incorporates a random challenge value that is used as the starting seed for the fingerprint calculation functions. This effectively forms a salt value to initiate the cryptographic calculation. In the preferred embodiment this salt is a 512-bit random value, although it will be appreciated that various sizes of salt may be employed. Fundamentally the only key requirements are that the salt generation is random enough so that it cannot be predicted by an attacker, and that it contains a sufficient number of bits so that natural reoccurrences of the same value do not occur frequently enough to weaken the security of the approach.

Due to the avalanche effect of one-way cryptographic calculations, whereby any change to the input provides a completely unpredictable impact onto the output, any change in the input salt completely changes the generated correct fingerprint value. The idea is that the same random salt value should not be reused too many times for the attestation of devices. This makes a replay attack against the attestation protocol impractical. A device running a malicious version of the code would not have been able to observe the correct fingerprint response for a given challenge value. Thus when presented with a challenge value for attestation the only viable way it can present the correct fingerprint value is by actually performing the cryptographic operation on the untampered version of the code in the system. Thus a challenge-response approach provides much enhanced trust to the attestation process.

In a one embodiment the client executable code that is to be hashed can be extracted from the client device. In this case the server device is able to perform the same cryptographic calculation as the client device using the same random challenge value. Thus the server device is able to determine the correct result required for a passed attestation. Only a client device with the untampered correct code is able to generate this correct response. Protections are put in place in the client device to ensure that the calculation is performed on the running code rather than a copy of the code, as this would be a way to spoof a correct response while actually executing tampered code.

In some embodiments it might not be possible to extract a copy of the client code for the purposes of the attestation calculation. This may be because the code may vary on different variants of devices, or that the calculation used to generate the result is far more complex than a simple cryptographic hash of the code and execution needs to be performed on the target device to obtain the correct answer. This presents a significant complication since the fingerprint which is considered to be correct is dependent on the random challenge salt used. Since the security of the approach relies on the salt only be used a few times it is necessary to constantly renew the database on the server with new combinations of challenge salt values and the known good fingerprint values that will result from a combination of an untampered code base using that starting salt value. In order to achieve this goal, a crowd sourced mining approach is employed in the preferred embodiment. The principle is that the calculation of new known good challenge-response pairings is performed as part of the process of performing a challenge-response test at some earlier time on a different client device. Thus we employ the population of devices that are being attested as the means to renew the security. We term this creation of new challenge-response pairings from existing devices as mining. To avoid the possibility of replay attacks, the scheme does not use the challenge-response that has been mined on a particular device on that particular device again in the future for attestation. It is assumed that there is essentially a random relationship between the client device upon which a challenge-response was mined upon and the device presented with that challenge in the future. Since it is impractical for an attacker to monitor all traffic to all client devices it is not practical to mount a replay attack.

Figure 9:
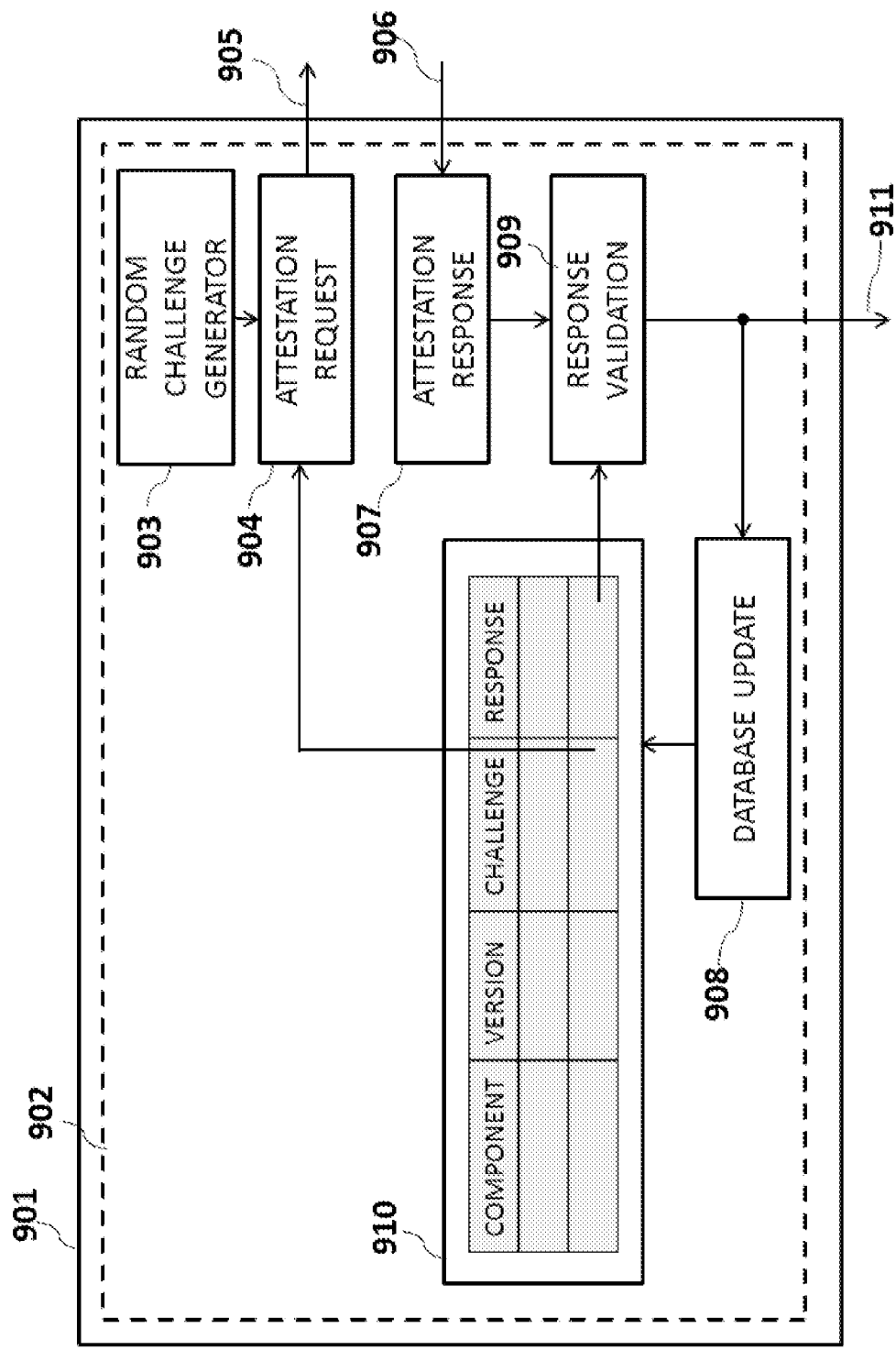
FIG. 9 illustrates how the server attestation mining might be extended to a challenge-response style algorithm whereby responses from a device may be used to mine challenges for future attestation requests on different devices.

FIG. 9 illustrates the architecture of the server 901 used to implement the challenge-response mining protocol. This aspect of the attestation mechanism is shown as 902, omitting other aspects of the server for simplicity. When an attestation request is required then the attestation request module 904 is employed to send the request to the remote client device via the communication 905. In this scheme the attestation request consists of a bundle of different attestation requests, each with their own challenge value and the set of application/platform software code that should be fingerprinted by the challenge. In the preferred embodiment the attestation consists both of the actual attestation checks and also of the mining of new known good responses for future checks on other devices. The new challenges require new random challenge values from the generator module 903. The existing challenges values are gathered from the database 910. For the method to be secure it is important that the client device is not aware of which challenges have a known good value that will be checked and which are actually mining challenges. Thus the attestation request module 904 should randomly mix these up before sending them to the client device. They should contain no distinguishing features that would allow the client device to differentiate between them. The attestation response module 907 receives the fingerprint responses from the remote client device via the communication 906. These are then passed to the response validation module 909. This is responsible for checking the fingerprint responses that are associated with known challenges that were sent as part of the attestation request. The outcome of this check is then sent as communication 911 to the original requester of the attestation, showing if the attestation passed or not. The database update module 908 is responsible for updating the database on the basis of the response validation. If the attestation fails then no changes are made to the database, allowing the existing challenge-response values in the database to be reused for future attestation checks. If the attestation passes then we remove the challenge-response pairing that has just been used to attest the client device, since we wish to avoid using it again in the future as a precaution against replay attacks, as discussed previously. In its place we add the new challenge-response values that were mined from the client device that paired a new random challenge value with the fingerprint returned. Although we are unable to directly attest this fingerprint we accept its authenticity from the fact that it was generated from a client device with a known good fingerprint and was provided as part of the same set of challenges that provided that known good fingerprint. Thus we transitively assume that the new fingerprint provided is good as well. This new challenge-response pairing will then be provided to some other future device for an attestation check.

It will be appreciated by those skilled in the art that the scheme as outlined may be enhanced to provide multiple outstanding known good challenge-response pairings. In particular it is necessary to retain some history of previous known good challenge-responses as a fall-back position, should the database become corrupted with an incorrect challenge-response pairing. This would then cause all subsequent attestation checks to fail. Since this occurrence could potentially be used as a denial-of-service style attack against the system, it is necessary to maintain some history that can be used to check future devices that fail attestation.

The invention claimed is:

1. A computer-implemented method of enabling a server computing device to determine if a client software application executing on a client computing device has not been tampered, the method comprising the steps of:
    software executing on the server computing device, the software communicating either directly or indirectly with an attestation server;
    the client software application running on the client computing device, the client software application communicating with the same said attestation server;
    the client software application calculating a cryptographic hash fingerprint of its executing code image, wherein the cryptographic hash fingerprint is communicated to the attestation server to prove that the client software application is untampered;
    the attestation server generating a pass or fail attestation result;
    communicating the attestation result between the attestation server and the server computing device;
    controlling the behaviour of the server computing device in a way that is conditional on whether a prior attestation of the client software application was a pass or fail attestation result,
    wherein the communication between the attestation server and the server computing device is communicated indirectly via the client computing device by use of a signed token provided from the attestation server to the client computing device, in which:
        a shared secret key is known by the attestation server and the server computing device but not by the client computing device;
        said shared secret key being used to sign the token such that it proves that the signer is in possession of the secret key.

2. A method as recited in claim 1 wherein the calculation of the cryptographic hash is influenced by a nonce value supplied by the attestation server to protect against a known good response being replayed to falsify the correctness of a client software image.

3. A method as recited in claim 2 wherein the correct fingerprint results for the cryptographic hash are gathered by executing a known good software application on a known good client computing device.

4. The method of claim 3 in which the calculation of new, known good challenge-response pairings is performed as part of the process of performing a challenge-response test at some earlier time on a different client device.

5. A method as recited in claim 1, wherein the server computing device terminates further communication with the client computing device if the client computing device has failed attestation.

6. A method as recited in claim 1, wherein fraud can be prevented, comprising the steps:
    unique characteristics of the client computing device on which the client software application is executing are extracted and passed to the attestation server;
    the code used to extract the characteristics forms part of that attested for integrity;
    the attestation server can pass the collected information to the server computing device which can compare it against other information provided by the client software application;
    the attestation server may reject requests made by the client software application when there is inconsistency in the information from the two paths that may be indicative of fraud.

7. A method as recited in claim 1, wherein communication termination is used in the domain of Distributed Denial of Service (DDoS) attack mitigation by ensuring that server computing device computing resources are only used for servicing attested clients and rejecting attempts to access server computing device resources from malicious client computing devices unable to pass attestation.

8. The method of claim 7 in which requests from unattested applications are rejected before they have any opportunity to issue malicious requests designed to expend the resources of or exfiltrate confidential data due to security flaws from the server computing device.

9. A method as recited in claim 1, wherein fingerprints for the client software application and operating system components are gathered independently and stored in different parts of the database on the attestation server.

10. A method as recited in claim 1, wherein the server computing device refuses to provide requested services and/or data to the client computing device if the client computing device has failed attestation.

11. The method of claim 10 wherein the server computing device is a software licensing server.

12. A method as recited in claim 1, wherein the token is cryptographically signed with the inclusion of the shared secret key value known to the server computing device and to the attestation server but not known to the client computing device.

13. The method of claim 12, wherein in the cryptographic signing, a Hashed Message Authentication Code (HMAC) protocol is used with a SHA256 hashing algorithm.

14. The method of claim 12, wherein the token includes an expiration time and unique information about the client computing device.

15. The method of claim 13, wherein the token includes an expiration time and unique information about the client computing device.

16. The method of claim 14, wherein the unique information about the client computing device includes the internet IP address of the client computing device.

17. The method of claim 15, wherein the unique information about the client computing device includes the internet IP address of the client computing device.

18. A system including a server computing device, a client computing device and an attestation server,
  wherein the server computing device is configured to determine if a client software application executable on the client computing device has not been tampered, wherein:
    the server computing device is configured to execute software, the software executable to communicate either directly or indirectly with the attestation server;
    the client computing device is configured to run the client software application, the client software application executable to communicate with the same said attestation server;
    the client software application is executable to calculate a cryptographic hash fingerprint of its executing code image, wherein the client software application is executable to communicate the cryptographic hash fingerprint to the attestation server to prove that the client software application is untampered;
    the attestation server is configured to generate a pass or fail attestation result;
    the attestation server is configured to communicate the attestation result between the attestation server and the server computing device;
    the server computing device is configured to control the behaviour of the server computing device in a way that is conditional on whether a prior attestation of the client software application was a pass or fail attestation result,
  wherein the system is configured to communicate between the attestation server and the server computing device indirectly via the client computing device by use of a signed token provided from the attestation server to the client computing device, in which:
    a shared secret key is known by the attestation server and the server computing device but not by the client computing device;
    the attestation server is configured to sign the token using said shared secret key such that it proves that the signer is in possession of the secret key.

19. The system of claim 18, wherein the attestation server is configured to cryptographically sign the token with the inclusion of the shared secret key value known to the server computing device and to the attestation server but not known to the client computing device.

20. The system of claim 19, wherein the token includes an expiration time and unique information about the client computing device.

* * * * *